July 5, 1960

J. B. JOHNSON ET AL 2,944,152

FIRE DETECTION

Filed June 30, 1955

INVENTORS
John B. Johnson
Neal T. Williams
BY George H. Fritzinger
Agt.

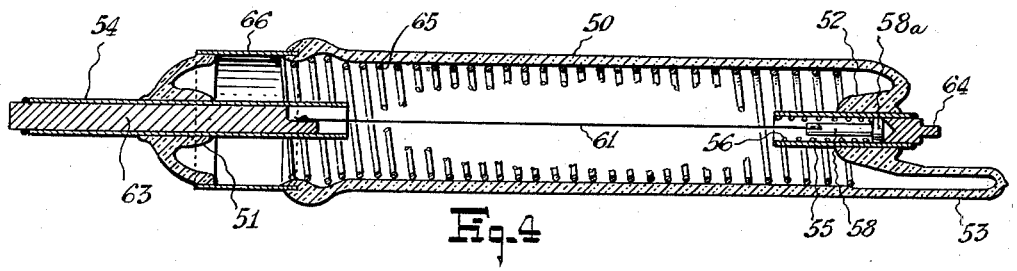
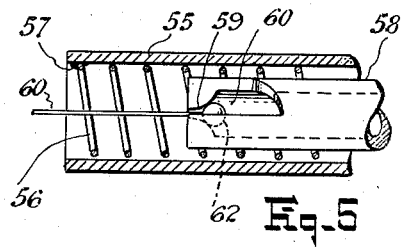
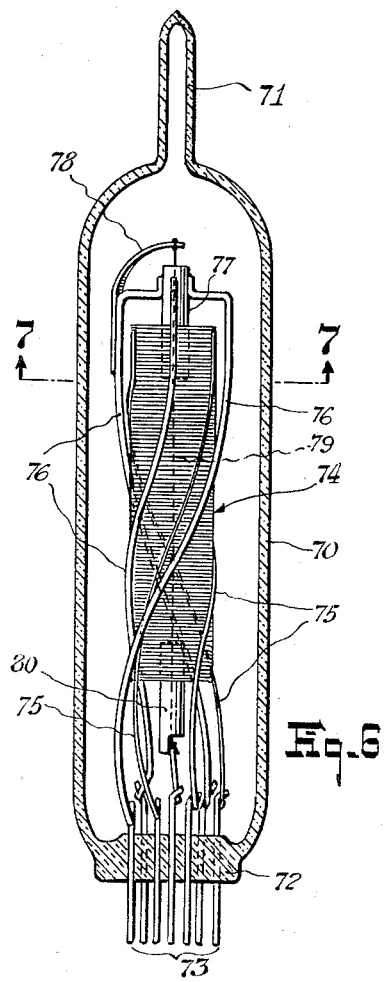
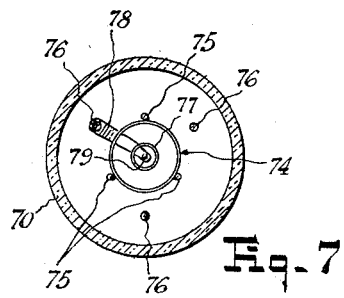

United States Patent Office 2,944,152
Patented July 5, 1960

---

2,944,152

FIRE DETECTION

John B. Johnson, Maplewood, and Neal T. Williams, Bloomfield, N.J., assignors, by mesne assignments, to McGraw-Edison Company, Elgin, Ill., a corporation of Delaware Filed June 30, 1955, Ser. No. 519,062

7 Claims. (Cl. 250—83.6)

This invention relates to fire-detection apparatus employing a novel form of Geiger-Mueller tube and circuit (such tube being hereinafter referred to simply as a G.M. tube), and more particularly the invention relates to such apparatus which is adapted for detecting engine oil fires on aircraft, wood fires in buildings, etc.

A general object is to provide such fire-detection apparatus which is operative throughout extreme ranges of temperature, which has a very low probability of giving false alarms, and which is sufficiently rugged for aircraft use.

Another object is to provide such detection apparatus which is sensitive to ultra-violet radiation but insensitive to solar radiation as well as radiation from most other sources except open flame.

Another object of the invention is to provide a new G.M. tube and circuit therefor which has increased sensitivity and which is more reliable than the usual form of such apparatus as heretofore known and used.

It is another object to provide an improved G.M. tube which is however not self-quenching, and then to effect the quenching by external circuit means.

Another object is to provide an improved G.M. tube having a central cathode construction and having the ability to provide very large pulses when an external capacity is connected across the tube.

Another object is to provide such improved G.M. tube wherein the aforestated capacity is utilized with a series resistance to quench each discharge of the tube.

A further object is to provide a load circuit for such G.M. tube, which is adapted to integrate the successive pulse discharges of the tube when the tube is excited by a continuous source of radiation to provide a progressive build-up of the output voltage.

Another object is to provide a G.M. tube of novel construction and arrangement adapted to enhance its response, increase its independability, simplify its construction, improve its ruggedness and reduce its cost.

Another object is to provide an alarm apparatus adapted to be controlled by a G.M. tube to provide an alarm only so long as the G.M. tube is exposed continuously to ultra-violet radiation within a predetermined wave-length range.

A further object is to provide such an alarm apparatus comprising a grid-type arc tube adapted to be triggered by a G.M. tube and including means for recurrently quenching the arc tube whereby a pulsing voltage is provided to operate an alarm only so long as the triggering voltage is maintained. These and other objects and features of our invention will be apparent from the following description and the appended claims.

In the description of our invention reference is had to the accompanying drawings, of which:

Figure 4 is an axial section of a second embodiment of G.M. tube according to our invention;

Figure 5 is an enlarged sectional view of a portion of this tube;

Figure 6 is an axial section with internal parts shown in full of a third embodiment of G.M. tube according to our invention; and Figure 7 is a cross sectional view of this tube taken on the line 7—7 of Figure 6.

Figure 1:
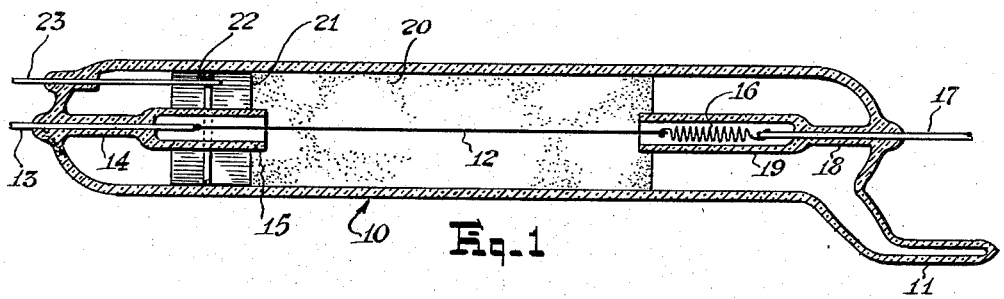
Figure 1 is an axial section of one embodiment of a G.M. tube of novel construction according to our invention.

The G.M. tube shown in Figure 1 comprises a cylindrical bulb 10 made of a glass capable of transmitting ultra-violet radiation. The bulb has generally rounded end walls and is provided with an extending exhaust tube 11 at one end. At the axis of the tube there is a fine wire 12 which differs from the usual G.M. construction in that it is herein employed as the cathode. One end of this wire is welded to a terminal 13 which passes through the wall of the bulb via an internal stem 14 thereof. The inner end of this glass stem terminates into an integral tubular member 15 which surrounds and shields an end portion of the cathode. The other end of the cathode wire is connected by means of a tension spring 16 to a second terminal 17. This second terminal extends through the second end wall of the bulb via an internal stem 18 thereof. The stem 18 terminates into an integral tubular member 19 which surrounds and shields the adjacent end of the cathode as well as the spring 16.

The anode of the tube is concentrically arranged with the cathode and may comprise a thin, conductive film 20 deposited on the inner wall of the bulb throughout the length of the central portion of the cathode between the tubular members 15 and 19. The film 20 may be of carbon or of metal such as nickel or platinum. A carbon film may be deposited on the inside wall as by flowing over it a colloidal carbon in an alcohol suspension and then baking it onto the glass in air at 500° C. A coating of platinum or other metal may be deposited by a similar technique or by evaporation or sputtering in a gas discharge. Whether the film is of metal or carbon, it should be deposited to such thickness that it will transmit ultra-violet radiation with about 40% efficiency and will not have an electrical resistance appreciably more than 50,000 ohms throughout its length.

An end portion of the anode film is provided with a heavy conductive coat 21 as of silver, platinum, gold or other suitable metal. A resilient wire 22 of platinum-clad molybdenum is in spring contact with this silvered surface. Welded to this wire is a terminal 23 leading outwardly through the adjacent end wall of the bulb. The bulb is filled with a gas to a pressure between 10 cm. Hg and atmospheric pressure. A preferred gas is a mixture of $H_2$ and Ne in the ratio of 7 to 5 cm. Ne with 3 to 5 cm. $H_2$.

As steps in processing the tube, the electrodes are thoroughly cleaned and out-gassed. The out-gassing is performed by evacuating the bulb and concurrent baking. The cathode may be independently heated by electric current from a current source connected across the cathode by way of two external terminals thereof; and the anode may be independently heated by electronic bombardment or induction heating. After the out-gassing operation is completed to about $10^{-9}$ mm. Hg, pure neon and hydrogen gases are admitted, and the bulb is then sealed. Typically neon is admitted through a grease-free valve from a bulb of spectroscopically pure neon gas and hydrogen, admitted through a heated palladium tube.

Since the present device is adapted particularly for detecting engine oil fires on aircraft, it is to respond to ultra-violet radiation from hydrocarbon flames but must not of course be responsive to ultra-violet radiation from the sun. For this reason the device is made responsive only to ultra-violet radiation at wave lengths below 2900 A. whereat solar radiation is substantially cut off by the atmosphere. A preferred operating wave length range below this cut-off point is between 2800 A. and 2200 A. The lower wave length is set by the limit of transmission of the glass of the bulb. Well-known glasses for the bulb which will pass ultra-violet radiation in this range, of which Corning Glass No. 9741 is an example, have transmission characteristics which begin to cut off at 2800 A. and which fall nearly to zero at 2000 A. In order that the device will be inherently insensitive to radiation at wave lengths greater than 2800 A., a cathode material must be selected which has a work function of not less than about 4.4 electron volts. Also, in order that the sensitivity will not continue below about 2500 A., the work function should not be much more than 5 electron volts. Operable materials for the cathode are carbon, copper, tungsten, nickel and platinum having respectively normal work functions of 4.34, 4.4, 4.52, 5.03 and 5.3. Of these three materials, however, tungsten is preferred.

It should be noted that as a further processing step the cathode is preferably heated to a high temperature of the order of 2500° K. after the neon and hydrogen gases have been admitted and the bulb sealed. The advantage of this heating step is to assure that the cathode will be sensitive to ultra-violet radiation and that it will have stabilized characteristics. Without such heating, some G.M. tubes may go into sustained pulsing with the discharge occurring at localized points on the cathode. This heating of the cathode does not change its work function, but does appear to change the probability of escape of photoelectrically emitted electrons.

Figure 2:
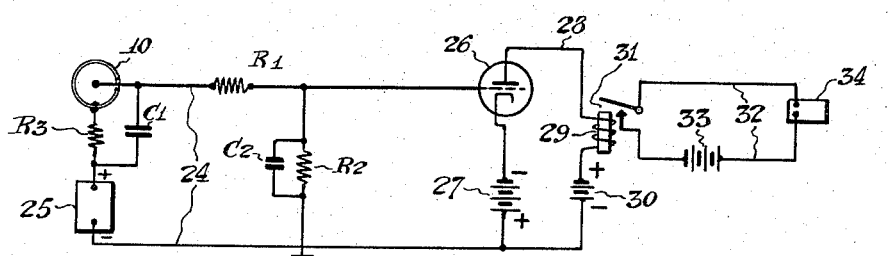
Figure 2 is a simplified schematic diagram of a detector circuit including our improved G.M. tube.

In the simplified detector circuit shown in Figure 2, the G.M. tube 10 has a power supply circuit 24 including a high voltage source 25 of the order of 700 volts and including a quenching means in the form of a condenser $C_1$ in shunt with the tube and a resistor $R_1$ in series therewith. As will later appear, the quenching means operates to establish the rate of the discharge pulses according to the time constant, $R_1C_1$. A resistor $R_3$ is preferably included in the discharge circuit of the condenser $C_1$ so as to limit the discharge current. This has the advantage of improving the life of the tube and of stabilizing its characteristics. In the circuit 24 there is a load means for the G.M. tube which serves also as a means for integrating the discharge pulses. This load and integrating means comprises a series condenser $C_2$ and shunt resistor $R_2$. A utilization device for the G.M. tube comprises an electronic tube 26, preferably a cold cathode Thyratron, or other grid-controlled arc-discharge type of tube, having its grid and cathode connected across the integrating load condenser $C_2$. The cathode is however biased negative relative to the grid as by a voltage source 27. The plate circuit 28 of the tube 26 serially includes a relay 29 or other utilization device and a plate voltage supply 30. The relay 29 controls a pair of contacts 31 in a circuit 32 serially including a power source 33 and an alarm device 34.

In the ordinary G.M. tube with central anode construction the size of pulse, as measured by the amount of charge passed, is limited by the space charge of gas ions which form during the pulse around the anode. This space charge layer prevents any further build-up of the discharge avalanche. The pulse size is relatively small. To insure that a second discharge is not initiated by the ionization products remaining in the discharge space after the termination of the avalanche, a quenching means is provided. This may be an organic or other vapor added to the other gases in the tube, or a circuit means which reduces the voltage from the power supply for a certain short time, or a high resistance in series with the tube which serves the purpose of temporarily reducing the voltage. These are common expedients.

In our tube with central cathode, there is no space charge layer formed around the central wire to limit the discharge but, instead, the whole electrostatic capacity across the tube tends to discharge through the tube until the voltage is reduced below the sustaining voltage of the discharge. Thus the size of the discharge pulse can be increased by adding capacity in parallel with the tube, which normally would not alter the pulse size in the normal G.M. tube. In our tube the pulses may be thousands of times larger than those of the central anode G.M. tube, which constitutes an important advantage not before achieved in the art.

In our tube, furthermore, we avoid the use of organic vapors, which when used introduce several disadvantages. At low temperatures they tend to condense out and become ineffective. At high temperatures they tend to decompose and change the operating characteristics of the tube. They tend to change the work function of the cathode, which in our application would alter the desired spectral response. They decompose by the normal operation of the discharge and so limit the life of the tube. Finally, if a tube with organic vapor ever goes into an overload condition of sustained oscillations its characteristics change so radically as to make it useless for its normal application.

Instead of the organic vapor, as a quenching agent, we quench by the series resistance. Since with our tube we can add external capacity, and since the voltage swing is much larger than with the central anode tubes, we can use a smaller resistance than is usual with the conventional tubes, say 50 megohms instead of 500 megohms. The time constant of the $R_1C_1$ combination must be such that the voltage across the tube does not reach the normal re-ignition voltage until the ionization products of the previous discharge have been dissipated. This usually requires a time of a few milliseconds.

The operation of our G.M. tube is, for example, as follows: When the tube is exposed to ultra-violet radiation an electron is released from the cathode and is drawn towards the anode but is immediately in a region of such high electric field intensity still near the cathode that it ionizes an atom or molecule of the gas by collision. This liberates another electron which again ionizes by collision another atom or molecule, and so on, with the result that almost instantly an avalanche of ionization is built up along the length of the cathode. Until a discharge occurs, the condenser $C_1$ is charged to the potential of the source 25. As soon as the avalanche of ionization occurs a discharge of the condenser starts through the tube. This discharge continues until the voltage on the condenser falls to a value below the sustaining voltage for the tube, at which time the discharge is extinguished and the voltage of the condenser builds up again from the external source 25 through the resistor $R_1$. The time constant $T_1$, equal to $R_1C_1$, is the time in which the voltage recovery is about two-thirds completed.

The deliberate addition of the condenser $C_1$ across the tube improves the operation in that it enables quenching to be accomplished with reasonable values of the series resistor $R_1$ and in that it increases the magnitude of the current pulses, as aforestated. For example, the condenser $C_1$ may typically have a capacity of about 200 mumuf. and the resistor $R_1$ may have a resistance of 30 megohms, giving a quenching time of 6 milliseconds. The charge transferred per pulse is then of the order of $10^{-7}$ coulomb. In contrast, the discharge per pulse from an ordinary G.M. tube with a central anode is only of the order of $10^{-11}$ coulomb.

The resistor $R_3$ in the discharge circuit is beneficial not only in limiting the maximum discharge current but also in eliminating any possibility of self-repeating pulses.

A typical value of this resistor is of the order of 50,000 ohms. The time constant $R_3C_1$—which is the time constant for the discharge of the condenser $C_1$—is then of the order of 10 microseconds, it being purposely made much shorter than the time constant $R_1C_1$ establishing the time rate of the pulses.

The present detector system is adapted to operate only in response to a series of successive pulse discharges of at least a predetermined minimum number, this being so that the system will not give false alarms in response to the random individual single pulses caused by cosmic rays. For this reason the G.M. tube is provided with the integrating load device in the form of the resistor $R_2$ and the condenser $C_2$ in parallel. This load device should have a time constant which is relatively large compared to the time constant $R_1C_1$ of the quenching means. A typical time constant for the load device is of the order of 1 second provided by the use of a condenser $C_2$ having approximately .025 muf. and a resistor $R_2$ having approximately 40 megohms. The cathode of the tube 26 is biased negatively by the voltage source 27 so that a predetermined minimum number of discharge pulses must occur before the grid voltage is built up sufficiently to trigger the Thyratron tube 26. As a typical example, the Thyratron tube may trigger when the grid is about 77 volts positive relative to the cathode, and the fixed bias source may supply about 63 volts of this voltage, leaving about 14 volts that must be supplied from the G.M. tube. A discharge pulse having about $10^{-7}$ coulomb, as aforementioned, will develop an initial voltage of about 3.2 volts across the load condenser $C_2$ having .025 muf. capacity. This charge on the condenser $C_2$ begins immediately to leak off through the resistor $R_2$ but because the time constant $(R_2C_2)$ of the integrating means is so large relative to the time constant $R_1C_1$ of the quenching means, being in the ratio of about 160:1, a second discharge pulse arrives from the G.M. tube before any appreciable amount of the first pulse has leaked off and, as a result, the voltage on the condenser $C_2$ is built up by the successive pulses. The least number of pulses which can possibly trigger the Thyratron tube will be of the order of 5 provided the pulses occur at a very rapid rate relative to the time constant of the integrating-load means. On the other hand, if the pulses occur at a slower rate a correspondingly longer train would be required to trigger the Thyratron tube. In any event, there is required a continuous source of radiation which will give rise to a series of discharge pulses before the Thyratron tube will be triggered to set off an alarm.

The inability of the system to respond to separate single pulses well-nigh precludes any false alarms occurring from natural ionizing sources such as cosmic rays.

Figure 3:
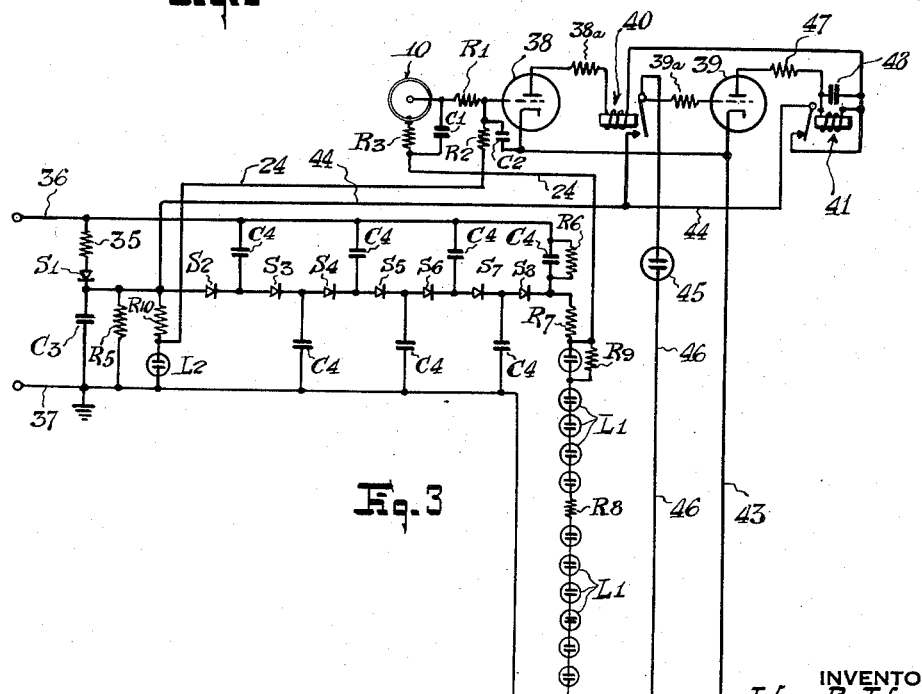
Figure 3 is a complete schematic circuit diagram of a detector apparatus employing our improved G.M. tube and showing particularly details of the high-voltage power supply for the tube.

A complete detector circuit with high voltage power supply is shown in Figure 3. In this circuit a D.-C. potential of about 750 volts is provided for the G.M. tube 10 by means of a voltage-multiplying rectifier chain comprising eight selenium rectifiers $S_1$–$S_8$ connected in series. The negative side of the rectifier $S_1$ is connected through a limiting resistor 35 to the ungrounded line 36 of a 115 volt A.-C. power supply having grounded line 37. The positive side of this rectifier $S_1$ is connected to the ground line through a filter condenser $C_3$ of about 25 muf. capacity and through a shunt load resistor $R_5$ of about 35,000 ohms. From the high voltage side of the resistor $R_5$ the remaining rectifiers $S_2$–$S_7$ are connected serially, and from the successive junction points between these rectifiers there are .1 muf. condensers $C_4$ connected alternately to the lines 36 and 37, the last condenser being shunted by a high resistance $R_6$ for safety. In operation a D.-C. potential across the condenser $C_3$ builds up to about the peak line voltage, which is about 150 volts. The next $C_4$ condenser adds somewhat more than half the peak voltage, and each succeeding $C_4$ condenser adds about half of the peak voltage. At the end of the chain the potential is about 750 volts positive with respect to the ground line 37. From this point to the ground line there is connected a stabilizing load consisting of the series resistances $R_7$ and $R_8$ and a bank of eleven neon glow lamps $L_1$. The lamps maintain a potential of about 65 volts each which varies little with current change. The resistances $R_7$ and $R_8$ serve to maintain the load current at a reasonable level. Across one lamp is shunted a high resistance $R_9$ to insure the ignition of all the lamps. The voltage stabilized by the entire bank of lamps $L_1$ is applied to the circuit 24 leading to the anode of the G.M. tube 10. The cathode of the G.M. tube is connected via the circuit 24 through the resistors $R_1$ and $R_2$ to a stabilized voltage point at about 63 volts above ground, which is the junction point between a resistor $R_{10}$ and a neon lamp $L_2$ connected serially across the load resistor $R_5$.

The alarm apparatus comprises two cold cathode hydrogen Thyratrons 38 and 39 and two electrical relays 40 and 41 connected respectively to the plates of the Thyratrons through respective current-limiting resistors 38a and 47. The cathodes of the tubes 38 and 39 are connected to the ground line 37 by a lead wire 43. The plates for these tubes derive their voltage from the aforementioned 150 volt point of the rectifier chain by way of the lead wire 44 and the normally-closed contacts of the relay 41. The grid of the first Thyratron tube 38 is connected to the junction between the resistors $R_1$ and $R_2$ and is therefore maintained approximately 63 volts positive with respect to the cathode potential. The integrating condenser $C_2$ is connected between this junction and cathode. Since the voltage required to trigger the tube is about 77 volts, an additional voltage of about 14 volts must be built up across the condenser $C_2$ by a succession of discharge pulses from the G.M. tube. When the Thyratron tube 38 is triggered, the plate current thereof actuates the relay 40 to close the contacts thereof. The closure of these contacts serves to connect an alarm device 45, for example a lamp or buzzer, across the 150 volt supply aforementioned via the lead wires 44 and 46. Also, it connects the grid of the next Thyratron tube 39 to the 150 volt line 44 via a current-limiting resistor 39a to trigger this tube also. The current discharge in the plate circuit of the Thyratron tube 39 actuates the relay 41 but with a short time delay introduced by the resistor 47 in the plate circuit and a condenser 48 connected across the winding of the relay. The resultant opening of the contacts of the relay 41 removes voltage from the plates of the two Thyratron tubes as well as exciting current from the relay windings and causes, therefore, the apparatus to be restored to its original condition as an incident following each triggering of the first Thyratron tube 38. This restoration of the apparatus involves the opening of the contacts of the relay 40 to interrupt the signal device 45, and involves the reclosing of the contacts of the relay 41. Immediately upon the closing of the latter contacts, plate voltage is supplied again to the two Thyratron tubes. Since a continuous source of radiation is required to trigger the first Thyratron tube 38 and the triggering voltage on the condenser $C_2$ will be present so long as the radiation source continues, the Thyratron tube 38 will discharge immediately again, upon the reclosing of the contacts of the relay 41, to provide another pulse operation of the alarm device, and so on, so long as the radiation source continues to excite the G.M. tube. Thus, there is provided a continuous pulse operation of the alarm device so long as the G.M. tube is excited, but this pulse operation is terminated within the time constant $R_2C_2$, the time required for the charge to leak off of the integrating condenser $C_2$, following removal of the excitation source from the G.M. tube 10.

The embodiment of G.M. tube shown in Figures 4 and 5 comprises a cylindrical bulb 50 of ultra-violet transmitting glass having axially-positioned and inwardly-projecting stems 51 and 52 at the ends and also an exhaust tube 53 at one end offset from the axis of the bulb. Tubes 54 and 55 of well-known Kovar metal, which is a metal having about the same coefficient of thermal expansion as that of the glass bulb, are sealed through the stems 51 and 52 respectively. Engaging the inner wall of the tube 55 is a helical compression spring 56 secured at its inner end 57 to the tube 55 as by spot welding (Figure 5). A pin 58 slidably fits the spring internally thereof and has a head 58a abutting against the other end of the spring. The pin is hollow but has a reduced-diameter axial opening 59 at its inner end. Leading through the inner end of the pin is also a quadrant-shaped cutaway to form a forked hook or socket 60 in the pin which is open at the side of the pin and which has the axial opening 59 at its apex. A cathode wire 61 as of tungsten is provided with a metal ball 62, as of nickel, at one end thereof and is welded to a steel rod 63 at the other end thereof, the weld point being at the axis of the rod. This cathode wire is inserted through the tube 54 and suspended by gravity into the tube 55 to effect engagement of the ball 62 with the socket 60. The cathode has such length that the steel rod 63 telescopes with the tube 55 when the ball and socket connection is so made. The steel rod is next drawn outwardly to effect the desired tensioning of the cathode wire and thereupon the rod is brazed or welded to the tube to effect an airtight seal therewith. The outer end of the other tube 55 is sealed closed by a steel plug 64 also brazed or welded thereto.

The anode comprises a spiral 65 of tungsten wire lying against the inside wall of the bulb 50. One end of this anode is welded to a metal ring 66, also preferably of Kovar, sealed at one end to the glass bulb and at the other end of the stem 51. The ring forms therefore an exposed metal terminal by which electrical connection is made to the anode.

In this latter embodiment the ends of the cathode wire are shielded by the metal tubes 54 and 55, the diameters of which are made sufficiently large to prevent discharges going to them instead of to the cathode wire. The metal-tubular mount for the cathode in this embodiment is a rugged one adapted to withstand the rigors of aircraft use and has also the advantage of enabling a precise location of the cathode in concentric relation to the surrounding anode.

In processing the foregoing G.M. tube the bulb is evacuated and the electrode elements are heated, the anode being heated as by baking and the cathode being heated also as by electric current. Following the out-gassing operation the neon and hydrogen gases are admitted to the desired pressure and the bulb is sealed.

It is sometimes desirable to be able to effect more complete out-gassing of the anode than is accomplished by baking alone during the evacuation of the bulb. A different internal construction shown in Figures 6 and 7 is adapted particularly to permit more complete out-gassing of the anode since this construction enables the anode to be heated by electrode bombardment or high frequency induction current. In this embodiment, a bulb 70 is employed having an exhaust tube 71 at the top and a base or stem 72 at the bottom through which are sealed a set of seven terminal pins 73. The anode 74 is a spiral of thin tungsten wire secured as by welding to three heavier nickel side rods 75. These rods are spaced at equal angular intervals about the axis of the bulb and are secured to three of the terminal pins 73. Three other of these terminal pins carry heavy nickel support rods 76 which are also spaced at equal angular intervals about the axis of the bulb but are at a greater spacing from the axis of the bulb than the support rods 75. The rods 76 are bent inwardly at the top and joined by welding to a shield tube 77 concentric with the anode. Joined by welding to one of the support rods 76 is a cantilever spring 78 which extends upwardly and over the top of the shield tube 77. Joined to this spring at the axis of the shield tube is a cathode wire 79 as of tungsten. This wire extends axially through the helical anode to the bottom of the bulb whereat it is supported by another of the terminal pins 73. Also, this other terminal pin carries a second shield tube 80 such as the tube 77, which is likewise in concentric relation with the anode and cathode whereat it is joined to its support means. All of the support rods 75 and 76 are given a long spiral pitch so as never to shade completely the cathode wire along its full length from any source of radiation.

The embodiments of our invention herein particularly shown and described are intended to be illustrative and not necessarily limitative of our invention since the same are subject to changes and modifications without departure from the scope of our invention, which we endeavor to set forth by the following claims.

We claim:

1. In a radiation-detection system: the combination of a Geiger-Mueller tube comprising a sealed vessel made of ultra-violet transmitting material and containing an ionizable gas, a central cathode wire element and a spaced surrounding anode element; a voltage supply circuit for said tube connected between said anode and cathode elements and tending to provide an avalanche discharge between said elements whenever the cathode element is excited by ultra-violet radiation; and means comprising an external condenser connected across said tube and a resistance connected serially in said voltage supply circuit adapted to quench said discharge and limit the same to a single pulse.

2. In a fire-detection system: the combination of a Geiger-Mueller tube comprising a sealed vessel made of ultra-violet transmitting material and containing an ionizable gas, a central cathode wire element and a spaced surrounding anode element; a voltage supply circuit for said tube connected between said anode and cathode elements and tending to provide a self-sustaining discharge between said elements whenever the cathode element is excited by ultra-violet radiation; and means in said circuit adapted to quench said discharge and limit the same to a single pulse of definite magnitude comprising a condenser and resistance connected across said tube and a second resistance connected between the voltage supply and said tube.

3. In a radiation-detection system: the combination of a Geiger-Mueller tube comprising a sealed vessel made of ultra-violet transmitting material and containing an ionizable gas, a central cathode wire element and a spaced surrounding anode element; a voltage source for said tube, a circuit connecting said voltage source serially with said elements of said tube, said circuit serially including a resistance to quench each discharge of said tube; and means for enabling a reduction in the value of said resistance required to quench said tube and for increasing the value of each pulse discharge of the tube comprising an external condenser connected in said circuit in shunt with said tube.

4. In a radiation-detection system: the combination of a Geiger-Mueller tube having anode and cathode elements; a voltage supply circuit for said tube comprising an external condenser connected across said tube and a resistor in series therewith, said condenser-resistor combination having a short time constant establishing the rate of pulse discharges of the tube when said tube is exposed to radiation; and a receiving device having a high-impedance grid-cathode input circuit and a condenser and resistor connected effectively in parallel across said input circuit, said second condenser-resistor combination having a relatively large time constant for integrating pulses from said tube to provide a build-up of voltage to said input circuit in response to a series of pulses from said tube within the time interval of the time constant of said second condenser-resistor combination.

5. In a radiation-detection system adapted to be unresponsive to random excitation and to be responsive to continuous excitation of a predetermined time interval: the combination of a Geiger-Mueller tube having anode and cathode elements; a receiving device having a grid-cathode input circuit, said receiving device being responsive to an increase of input voltage of predetermined magnitude; a high voltage source for said tube; a circuit connecting said tube and source serially with said input circuit and including a series resistor and a condenser shunting said tube for quenching each discharge of said tube within a time interval according to the time constant of said resistor-condenser combination, each of said pulses providing a voltage to said input circuit substantially less than said voltage increase required to operate said receiving device; and integrating means connected across said input circuit for building up the voltage of a series of pulses to operate said receiving device, said integrating means comprising a condenser and a resistor in shunt therewith, said latter condenser and resistor combination having a time constant substantially greater than that of said first-mentioned resistor-condenser combination.

6. A detector responsive only to a series of successive electric discharges of a predetermined minimum number comprising a Geiger-Mueller tube having a central cathode construction, said tube being inherently not self-quenching; a quenching circuit for said tube including a condenser in shunt with the tube and a resistor in series therewith; load means for said tube in said quenching circuit comprising a condenser and a resistor in shunt therewith; and an arc tube having grid and cathode elements connected across said second condenser, said arc tube being rendered conductive only when the voltage across said second condenser has increased by a predetermined amount, said load condenser and resistor elements having a substantially larger time constant than that of said quenching elements for causing said predetermined voltage increase to occur only in response to a predetermined minimum number of successive pulse discharges from said Geiger-Mueller tube.

7. An alarm apparatus comprising a grid-controlled arc tube; means for supplying a grid voltage to trigger said tube; means for supplying plate voltage to said tube; an alarm device; means for supplying activating current to said alarm device upon voltage breakdown of said arc tube; and a time-delay means responsive to each voltage breakdown of said arc tube for momentarily disconnecting the plate voltage supply from said tube to quench the same whereby a pulse activation of said alarm device is provided so long as said trigger voltage is maintained.

References Cited in the file of this patent

UNITED STATES PATENTS

| | | |
|---|---|---|
| 2,456,968 | Longini | Dec. 21, 1948 |
| 2,522,902 | Shamos | Sept. 19, 1950 |
| 2,671,873 | Meier | Mar. 9, 1954 |
| 2,676,270 | Lahti | Apr. 20, 1954 |
| 2,695,364 | Wolf | Nov. 23, 1954 |
| 2,712,088 | Whitman | June 28, 1955 |
| 2,721,276 | Exner | Oct. 18, 1955 |
| 2,744,697 | Van Allen | May 8, 1956 |

OTHER REFERENCES

Electronic Fire and Flame Detector, by P. B. Weisz, from Electronics, July 1946, pages 106–109.